United States Patent
Santos

(10) Patent No.: US 7,600,138 B2
(45) Date of Patent: Oct. 6, 2009

(54) LOW POWER ASIC CIRCUIT

(75) Inventor: Alfred John Santos, Farmington, CT (US)

(73) Assignee: Timken US Corporation, Torrington, CT (US)

( * ) Notice: Subject to any disclaimer, the term of this patent is extended or adjusted under 35 U.S.C. 154(b) by 483 days.

(21) Appl. No.: 11/269,337

(22) Filed: Nov. 8, 2005

(65) Prior Publication Data

US 2006/0097662 A1    May 11, 2006

Related U.S. Application Data

(60) Provisional application No. 60/626,225, filed on Nov. 9, 2004.

(51) Int. Cl.
*G06F 1/26* (2006.01)

(52) U.S. Cl. ..................................................... 713/320
(58) Field of Classification Search ................. 323/284, 323/285; 363/118; 713/320, 322, 330
See application file for complete search history.

(56) References Cited

U.S. PATENT DOCUMENTS 6,646,426 B2 * 11/2003 Terashi ....................... 323/285

* cited by examiner

*Primary Examiner*—Akm E Ullah
*Assistant Examiner*—Jue Zhang
(74) *Attorney, Agent, or Firm*—Michael Best & Friedrich LLP

(57) ABSTRACT

A method of managing power consumed by a circuit that can output a signal. The method includes determining a time duration after which the signal is valid, and determining an update rate of the signal. The method also includes supplying power to the circuit based on the time duration and the update rate, and latching the signal at the update rate.

9 Claims, 3 Drawing Sheets

LOW POWER ASIC CIRCUIT

RELATED APPLICATIONS

This application claims the benefit of the U.S. Provisional Application Ser. Nos. 60/626,225 filed on Nov. 9, 2004, the entire contents of which are incorporated by reference herein.

BACKGROUND

Embodiments of the invention relate to power management of sensing devices.

Sensing devices, such as steering sensors and the like, and associated circuitry often require relatively high power. For example, some sensing devices have built-in application-specific integrated circuits ("ASIC") or other circuitry components to provide functions for different applications. The sensing devices typically draw a large amount of current or power to function. However, some applications only use a portion of the functions offered by the sensing devices. Even though less than all the functions are used, the power requirements remain the same. As a result, the sensing devices are drawing, and therefore, consuming a relatively large amount of current or power to utilize only a portion of their functions.

SUMMARY

It would be desirable to use existing ASIC and similar sensors that generally require relatively high power in situations where power is limited. This avoids the need to modify the sensors for low-power applications, but require some method or device to operate the normally high-power sensors on less power.

In one form, the invention provides a method of managing power consumed by an existing device. The method includes sending data from the existing device, and controlling a duty cycle of the power consumed by an existing device. The duty cycle can typically include an ON time and an OFF time. The method also includes storing the data during one of the ON time and the OFF time.

In another form, the invention provides a system for managing power consumed by an existing sensing device. The system includes a sensing device configured to generate a data signal, and an oscillating module configured to receive the signal from the sensing device. The oscillating module is also configured to generate a control signal that has an ON time and an OFF time. The system also includes a storage configured to store the data during one of the ON time and the OFF time.

In yet another form, the invention provides a method of supplying power to a sensing device. The method includes determining an amount of power to operate the sensing device, generating a power signal based on the amount of power to operate the sensing device, and pulsing the power signal to power the sensing device.

In yet another form, the invention provides a method of supplying power to a sensing device. The method includes determining an amount of power to operate the sensing device, determining a power signal based on the amount of power to operate the sensing device, and sampling data from the sensing device based on the power signal.

In yet another form, the invention provides an apparatus for supplying power to a sensing device. The apparatus includes an oscillator configured to receive data from the sensing device. The oscillator is also configured to generate a control signal that has an ON time and an OFF time. The apparatus also includes a latch configured to latch in the data during one of the ON time and the OFF time.

In yet another form, the invention provides a method of managing power consumed by a circuit that can output a signal. The method includes determining a time duration after which the signal is valid, and determining an update rate of the signal. The method also includes supplying power to the circuit based on the time duration and the update rate, and latching the signal at the update rate.

In yet another form, the invention provides a system for managing power consumed by a circuit operable to output a signal. The system includes a timing circuit, a switching circuit, and a storage. The timing circuit is configured to generate a timing signal. The switching circuit is configured to generate a power signal in response to the timing signal, and to supply the power signal to the circuit. The storage is configured to store the signal, and to output the signal.

In yet another form, the invention provides a method of controlling a first circuit. The method includes coupling power to an oscillating circuit, and pulsing power from the oscillating circuit to the first circuit. The method also includes generating an output signal at the first circuit, and holding the output signal at a memory.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

As should also be apparent to one of ordinary skill in the art, the systems shown in the figures are models of what actual systems might be like. Some of the modules and logical structures described are capable of being implemented in software executed by a microprocessor or a similar device or of being implemented in hardware using a variety of components including, for example, application specific integrated circuits ("ASICs"). Terms like "processor" may include or refer to both hardware and/or software. Furthermore, throughout the specification capitalized terms are used. Such terms are used to conform to common practices and to help correlate the description with the coding examples, equations and/or drawings. However, no specific meaning is implied or should be inferred simply due to the use of capitalization.

Embodiments of the invention relate to a system for managing power consumed by a circuit that generates a signal. The system includes a timing circuit that generates a timing signal, and a switching circuit that generates a power signal in response to the timing signal, and supplies the power signal to the circuit. The system also includes a storage to hold the signal.

Figure 1:
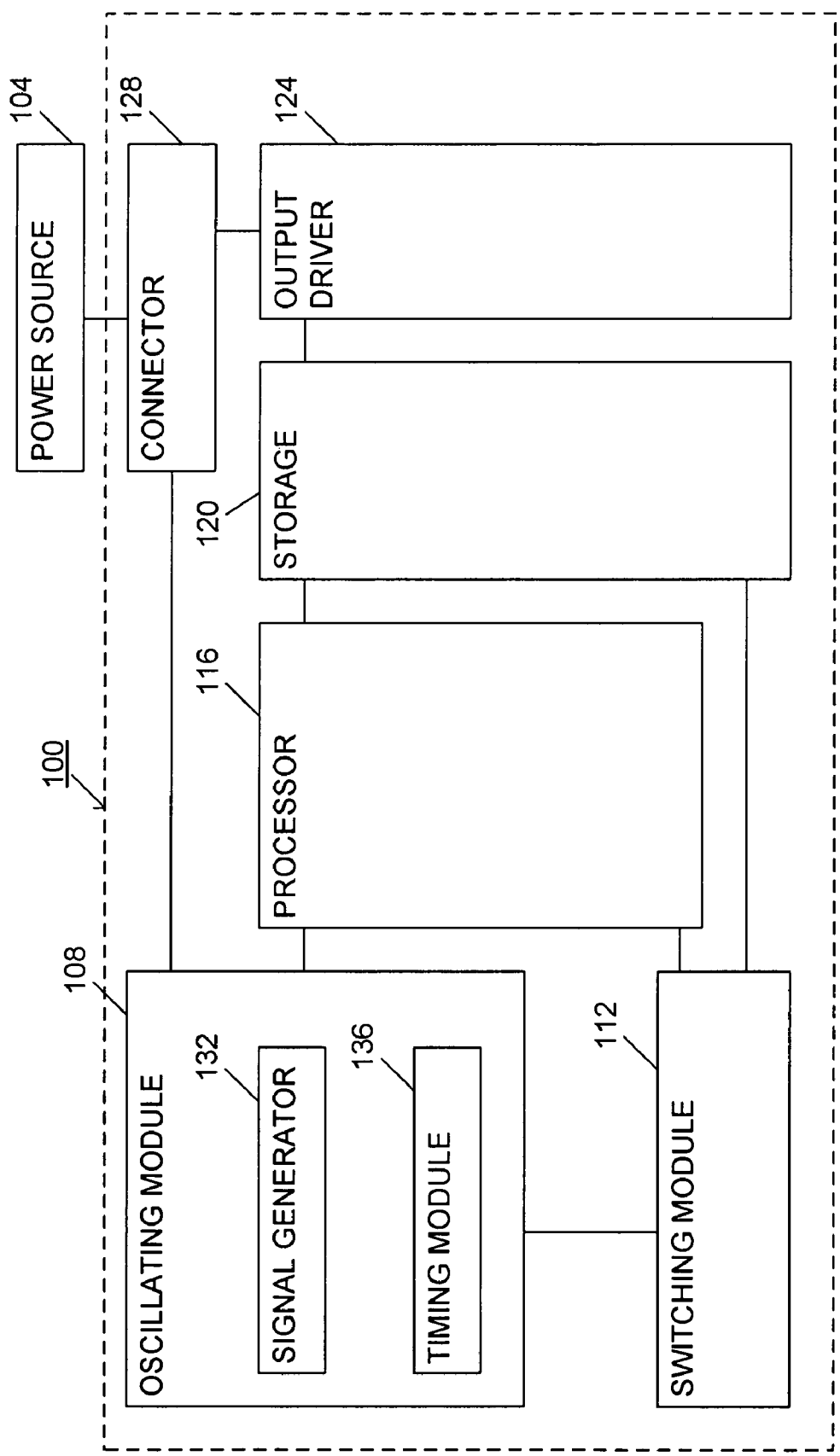
FIG. 1 is a block diagram of a sensing device.

FIG. 1 shows a sensing system 100 in block diagram format. The sensing system 100 includes an oscillating module 108 that receives a power signal from a power source 104 through a connector 128. The oscillating module 108 converts the power signal from the power source 104 into a second power signal, which is detailed hereinafter. In some embodiments, the oscillating module 108 includes a signal generator 132 and a timing module 136. The signal generator 132 then generates a timed signal based on settings of the timing module 136. A switching module 112 is activated by the timed signal, which in turn supplies the second power signal to activate a processor 116 for a predetermined amount or period of activation time. For example, the amount of activation time can be derived from the timed signal.

Once powered or activated, the processor 116 receives a plurality of sensed signals from a sensing element or sensor. The sensed signals may be in an analog format. The processor 116 can be a microprocessor, a micro-controller, an application-specific-integrated-circuit ("ASIC"), or the like. In some embodiments, the processor 116 includes the sensing element or sensor. An example of such processor is the MPS-32XF processor from Timken that includes a directional-sensing, Hall-effect encoder with an integrated index pulse and a high-accuracy resolution multiplying ASIC. In other embodiments, the processor 116 receives the sensed signals from a sensing element that is external to the processor 116. The processor 116 can include a memory that stores software or firmware programs and data used in the sensing system 100. The processor 116 processes the sensed signals and generates a processed signal based on the sensed signals. In some embodiments, the processor 116 converts the sensed analog signals into its digital equivalents. Once the activation time has elapsed, the processor 116 is electrically disconnected from the power source 104, or the switching circuit or module 112.

A storage 120 is coupled to the processor 116 to receive and to hold the processed signal. In some embodiments, the storage 120 includes a memory such as a dynamic random access memory. In other embodiments, the storage 120 can include a latch or a plurality of powered flip-flops. The sensing system 100 also includes an optional output driver 124 that interfaces between the sensing system 100 and a load that connects to the sensing system 100 at the connector 128. In this way, the processor 116 is only powered at a predetermined update rate. Output signals from the processor 116 remain available at the connector 128 through the storage 120 at the update rate. That is, the system 100 consumes power when the timed signal is active or high, idles when the timed signal is inactive or low, and stores, keeps or retains outputs of the processor 116 at the storage 120. As a result, the system 100 has viable output signals at the connector 128 without any noticeable difference to an end user while power is substantially disconnected from the processor 116, and power is therefore transparently saved.

Figure 2:
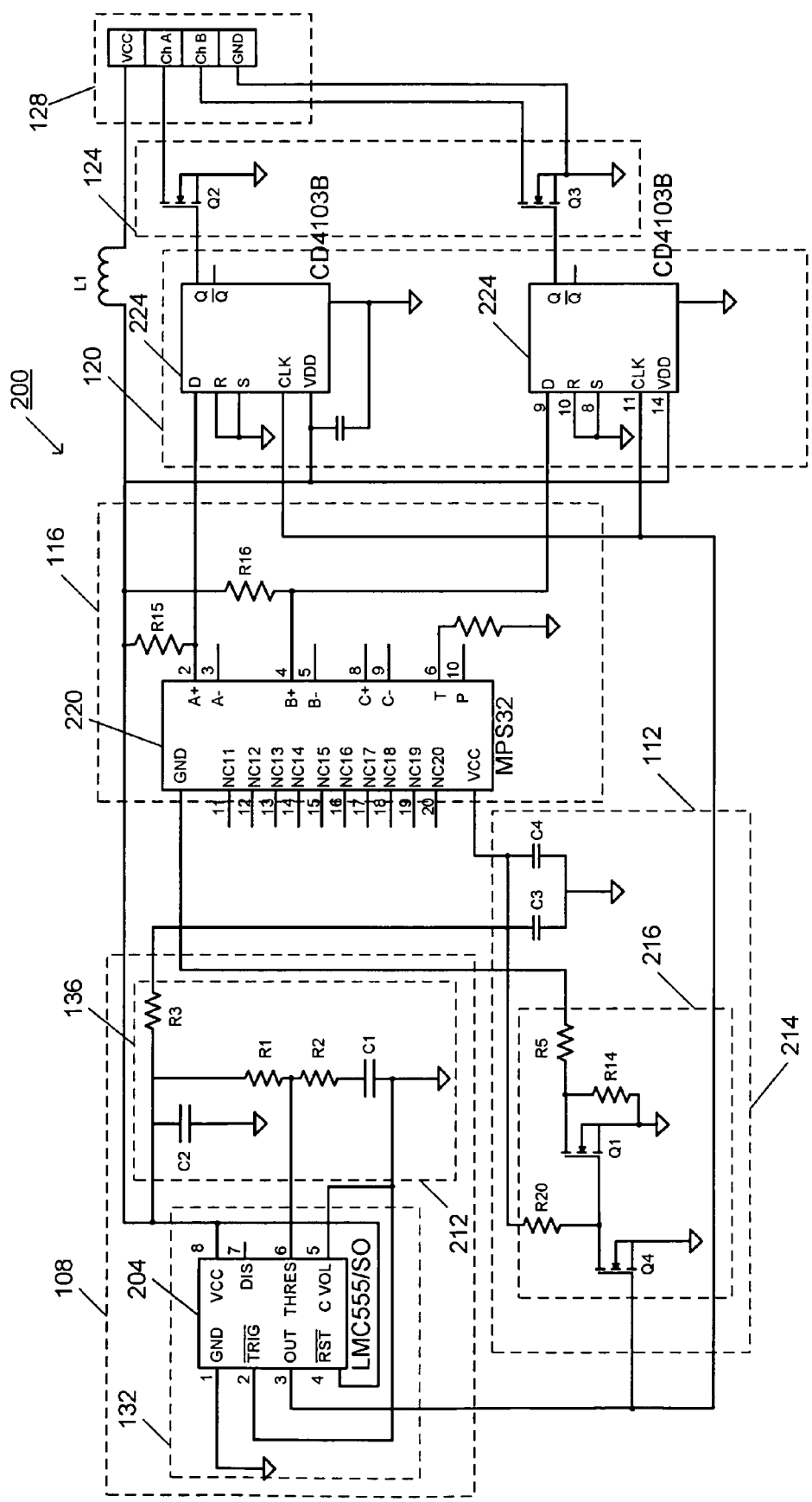
FIG. 2 shows a schematic of an exemplary sensing device.

FIG. 2 shows a schematic of an exemplary sensing device 200 (like parts in FIGS. 1 and 2 are referenced with like numerals). In the embodiment shown, the oscillating module 108 includes a signal generator 204 (132 of FIG. 1) that is powered and reset by the power source 104 (of FIG. 1). The oscillating module 108 also includes a timing module 212 (136 of FIG. 1). In the embodiment shown, the timing module 212 includes a resistor-capacitor combination (that includes R1, R2, C1, and C2). Particularly, the resistor-capacitor combination includes a set of resistors (R1, R2) in series arranged in a voltage divider configuration. The signal generator 204 receives its timing information from the timing module 212 to generate a timed signal. The values of resistors (R1, R2) are configured to control the timing information, and thus an active duration of the timed signal. In other embodiments, the resistors of the RC combination can be replaced by potentiometers. In this way, a user of the sensing device 200 can adjust the active duration of the timed signal and thus the activation time generated by the signal generator 204.

Particularly, the RC combination or the timing module 212 controls an ON time (ON state) which is often referred to as the active duration or a duty cycle, and an OFF time (OFF state) of the timed signal. In some embodiments, the timed signal is a square wave with, for example, a 10 percent duty cycle. That is, the timed signal is in the ON state 10 percent of the duration, and in the OFF state 90 percent of the duration. In some embodiments, the ON state indicates a high voltage such as 3.3 V, 4.5 V, or 5.5 V, while the OFF state indicates a low voltage between 0 V and 2 V.

During the ON state of the timed signal, the timed signal is used to activate a switching circuit 214 (112 of FIG. 1) that includes a transistor pair 216. Once activated, the transistor pair 216 activates the processor 116 that includes an ASIC 220. Coupled to the transistor pair 216 is a resistor R14 that is used to keep a very small current flowing in the ASIC 220 such that the ASIC 220 can be activated with a predictable bias to consistent logic states. For example, if the ASIC 220 includes a comparator that has hysteresis, the small current flowing in the ASIC 220 reduces or eliminates a randomness that can occur in the comparator. As a result, the ASIC 220 can be activated with a consistent bias to being ON or OFF. The ON time of the timed signal is set to ensure the ASIC 220 has stabilized and produces a valid output. Similarly, the OFF time is also set based on a desired update rate or sampling rate of the system 200, which can depend on the application at hand.

To make the power saving activity transparent to the load connected at the connector 128, the exemplary sensing device 200 also includes a pair of latches 224 in the storage 120 to keep or hold the data generated by the ASIC 220. Particularly, once the processor 116 (of FIG. 1) or the ASIC 220 has finished processing or converting the sensed signal, the ASIC 220 validates the processed signal or data during an initial or transient portion of the ON state. Thereafter, the latches 224 latch in the processed signal or data at a falling edge (from a high voltage state to a low voltage state) of the ON time. In some embodiments, a minimum ON time that the ASIC 220 requires to generate valid data is first determined experimentally. For example, the minimum ON time can be determined from a plurality of ASIC transient characteristics. In other embodiments, the minimum ON time can be determined from other properties such as an activation time and a stabilization time of the ASIC. In yet other embodiments, the ON time can be determined both experimentally and from transient characteristics of the ASIC 220.

After the minimum ON time has been determined, a safety time can be added into the ON time such that the entire ON time allows time for the latches 224 to latch in the processed data. For example, the ASIC 220 can take 0.1 seconds to completely generate the processed data. In such cases, an exemplary 0.05 seconds of time can be added to the ON time to result in an entire ON time of 0.15 seconds. In this way, the ASIC 220 can be assured of enough power to operate and process the sensed signal, and the latches 224 have enough time to latch the completely processed data. Of course, other safety times and other ON times can also be used depending on the desired application.

After the power has been supplied to the ASIC 220 during the ON time, and the latches 224 have stored the data from the ASIC 220, the power is disconnected from the ASIC 220. In this way, power will be saved while the ASIC 220 is idle. That is, power is substantially saved during the OFF time. For example, while the ASIC 220 can typically draw an average power of 0.125 W (5 V×25 mA), a 20 percent duty cycle of the power signal yields a power of 0.025 W. Thus, the system 200 achieves a power savings of about 0.1 W.

Figure 3:
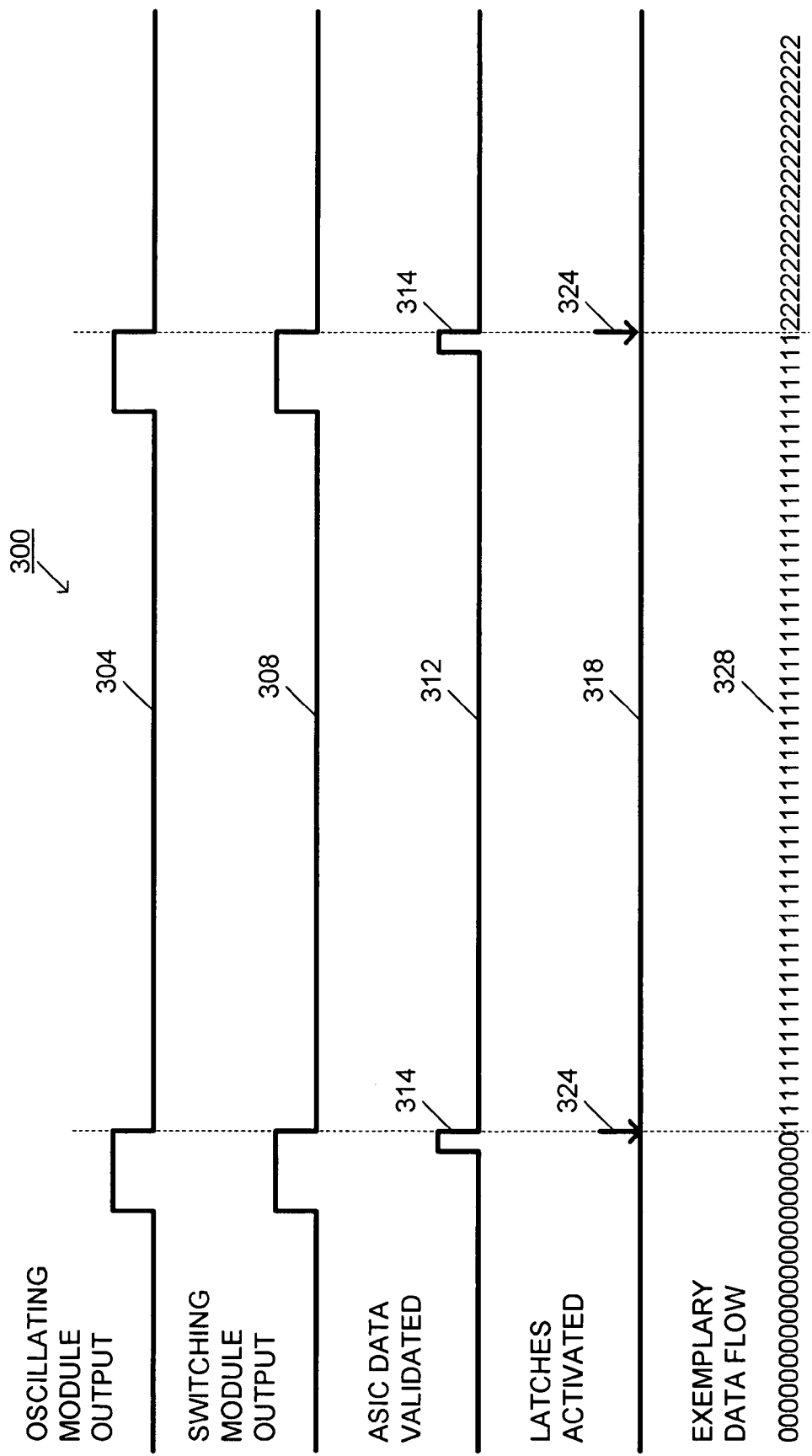
FIG. 3 shows a timing diagram of some signals generated by the exemplary sensing device.

FIG. 3 shows a timing diagram 300 of a plurality of signals including an oscillating module output signal (on the timed signal) 304 generated by the oscillating module 108, and a switching module output signal (or the second power) 308 generated by the switching module 112 in response to the oscillating module output signal 304. In the embodiment shown, the oscillating module output signal 304 has a 10 percent duty cycle. FIG. 3 also indicates that the switching module output signal 308 substantially follows the oscillating module output signal 304. For example, when the oscillating module output signal 304 is high, the switching module output signal 308 is also high. FIG. 3 also shows an ASIC data valid signal 312 that includes a plurality of pulses 314 which represent the safety times that can be added to the minimum ON time determined by processes described earlier. FIG. 3 also shows a latch activating timing signal 318 that indicates a plurality of falling edges 324 of the switching module output signal 308 that the latches 224 use to latch in the processed data.

To illustrate the data latching process, FIG. 3 also shows an exemplary set of data 328 latched in by the latches 224 with respect to the latch activating timing signal 318. The data 328 shows that a plurality of zeros (0) are at the latches 224 initially. As soon as the falling edges 324 happen, new data including a plurality of ones (1) and twos (2) are latched in. More particularly, the latches 224 latch in the data available from the ASIC 220 at the end of the pulses 314 or the falling edge 324. In this way, the latches 224 keep the data generated by the ASIC 220 while the ASIC 220 is idle, and the latched data is thus made available at the connector 128.

In embodiments where the sensing system 100 includes a steering wheel sensor, the oscillating module 104 is set up so that a complete cycle or the duration of the timed signal is faster than the steering wheel can move. In this way, whenever data is needed from the sensing system 100, current data is being sent by the sensing system 100 even though the ASIC 220 is only being powered a fraction of the time.

Thus, the invention provides, among other things, a sensing system that can operate on limited power. Various features and advantages of the invention are set forth in the following claims.

What is claimed is:

1. A method of managing power consumed by a power-consuming circuit that receives at least one sensed signal, and processes the at least one sensed signal, the method comprising:
   sensing a phenomena with a sensor and generating the at least one sensed signal in response thereto;
   generating an output signal with the power-consuming circuit in response to the processing of the at least one sensed signal;
   determining a time duration after which the output signal of the power-consuming circuit is valid;
   determining an update rate of the output signal of the power-consuming circuit;
   generating a timing signal, in an oscillating module, based on the time duration and the update rate, the timing signal having an ON time and an OFF time;
   supplying power to the power-consuming circuit during the ON time of the timing signal and disconnecting power to the power-consuming circuit during the OFF time;
   providing the timing signal and the output signal of the power-consuming circuit to a storage, the storage containing at least one latch; and
   latching the output signal at the update rate.

2. The method of claim 1, wherein determining the time duration comprises determining at least one of an activation time, a start-up time, a stabilization time, a transient time, and a safety time of the power-consuming circuit.

3. The method of claim 1, wherein determining the update rate comprises determining a duty cycle of the time duration.

4. The method of claim 1, wherein supplying the power to the power-consuming circuit comprises generating a power pulse based on the time duration and the update rate.

5. A system for managing power consumed by a power-consuming circuit that receives at least one sensed signal, processes the at least one sensed signal, and generates an output signal in response to the processing of the at least one sensed signal, the system comprising:
   a sensor that generates the at least one sensed signal and is connected to the power-consuming, integrated circuit;
   a timing circuit connected to the power-consuming circuit, the timing circuit generating a timing signal based on an update rate;
   a switching circuit connected to the power-consuming circuit and to the timing circuit, the switching circuit generating a power signal in response to the timing signal, and configured to supply the power signal to the power-consuming circuit for a predetermined minimum ON time and to disconnect power to the power-consuming circuit for a predetermined minimum OFF time; and
   a storage connected to the power-consuming circuit and connected to the timing circuit, the storage configured to receive the timing signal and store the output signal, and to output the output signal.

6. The system of claim 5, wherein the ON time comprises at least one of an activation time, a start-up time, a stabilization time, a transient time, and a safety time of the power-consuming circuit.

7. The system of claim 5, wherein the storage comprises a latch.

8. The system of claim 5, further comprising a driving circuit configured to interface the system with a load.

9. The system of claim 5, wherein the timing circuit further comprises at least one of a RC circuit and a voltage divider configured to adjust the timing signal.

* * * * *

UNITED STATES PATENT AND TRADEMARK OFFICE
CERTIFICATE OF CORRECTION

PATENT NO.       : 7,600,138 B2                                      Page 1 of 1
APPLICATION NO.  : 11/269337
DATED            : October 6, 2009
INVENTOR(S)      : Alfred John Santos It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this

Fifth Day of October, 2010

David J. Kappos
*Director of the United States Patent and Trademark Office*